United States Patent
Ho

(10) Patent No.: US 7,558,978 B2
(45) Date of Patent: Jul. 7, 2009

(54) POWER MANAGEMENT DEVICE FOR MULTIPROCESSOR SYSTEM AND METHOD THEREOF

(75) Inventor: Kuan-Jui Ho, Hsin-Tien (TW)

(73) Assignee: Via Technologies Inc., Taipei County (TW)

( * ) Notice: Subject to any disclaimer, the term of this patent is extended or adjusted under 35 U.S.C. 154(b) by 502 days.

(21) Appl. No.: 11/377,547

(22) Filed: Mar. 17, 2006

(65) Prior Publication Data

US 2007/0124610 A1 May 31, 2007

(30) Foreign Application Priority Data

Nov. 25, 2005 (TW) ................ 94141569 A

(51) Int. Cl.
*G06F 1/32* (2006.01)
*G06F 1/26* (2006.01)

(52) U.S. Cl. .............. 713/324; 713/300; 713/320; 713/323

(58) Field of Classification Search ............. 713/300, 713/310, 320–324, 330, 340
See application file for complete search history.

(56) References Cited

U.S. PATENT DOCUMENTS

| 5,983,354 | A * | 11/1999 | Poisner et al. ............. 713/320 |
| 7,174,467 | B1 * | 2/2007 | Helms et al. ............... 713/300 |
| 2003/0172310 | A1 * | 9/2003 | Moyer et al. ............... 713/300 |
| 2005/0262366 | A1 * | 11/2005 | Ma ............................ 713/300 |
| 2006/0288240 | A1 * | 12/2006 | Kardach et al. ............ 713/300 |

* cited by examiner

*Primary Examiner*—Thomas Lee
*Assistant Examiner*—Fahmida Rahman
(74) *Attorney, Agent, or Firm*—Rosenberg, Klein & Lee

(57) ABSTRACT

A power management device for multiprocessor systems and method thereof applied to force individual processor entering or leaving of a C3 state are disclosed. The device includes at least one checking unit, a plurality of recording units and a plurality of arbiters. The checking unit receives an event from a peripheral device, checks which processor the event corresponds and sends a checking signal. The event is received and recorded by one of the recording units according to the checking signal. Once the recording unit has no record of the received event, the corresponding processor turns the corresponding arbiter off and sends an entering C3 state command. A first control signal is sent to the processor according to the entering C3 state command so as to force the processor into the C3 state.

19 Claims, 4 Drawing Sheets

POWER MANAGEMENT DEVICE FOR MULTIPROCESSOR SYSTEM AND METHOD THEREOF

BACKGROUND OF THE INVENTION

1. Field of the Invention

The present invention relates to a power management device and method thereof, especially to a power management device and method used in a multiprocessor system.

2. Description of the Related Art

Due to the well-development of computer systems, it's getting difficult to dramatically increase speed of central processing unit (CPU). Thus, the trend for research and developments turns into multiprocessor system for improvement in operation speed of computer system. The multiprocessor system is generally consisted with a plurality of CPUs, and disposed in a computer system for improving operation speed of the computer system.

Since the CPU is one of the most power-consumptive components in the computer system, a lot of power will be consumed when a plurality of CPUs of the multiprocessor system runs at the same time, and thus a power management of the multiprocessor system is concerned. Among the power management technology for the multiprocessor system available now, there is an open industry specification—Advanced Configuration and Power Interface (ACPI) for efficient power management in the computer system, and the CPU could work in four processor power states, C0 state, C1 state, C2 state, and C3 state. The C0 state is that the CPU executes instructions while the C1, C2, C3 states are low power states in different levels. Particularly, the C3 state is in a sleep mode, which is the most electricity-saving state of the CPU.

Refer to FIG. 1, a first CPU 10 and a second CPU 12 respectively couple to a north bridge (NB) chip 14 by a mutual bus in the multi-processor system. An operating system shuts down an arbiter 15 of the NB chip 14 until the CPUs 10, 12 trans it to the C0 state before, and the NB chip 14 stops sending any event from the NB chip 14 to the CPUs 10, 12 in the C3 state therefore. After the arbiter 15 is shut down, a south bridge (SB) chip 16 sends a control signal to the CPUs 10, 12 for entering the C3 state. Both of the CPUs 10, 12 can't snoop any events.

The NB chip 14 will shut down the arbiter 15 to stop transit the events when one of the CPUs 10, 12 enters the C3 state, and all of the CPUs can't snoop the events no matter the CPUs is in C3 state or not. However, if the arbiter 15 is not be shut down and sends events to the CPU not in the C3 state, the CPUs will snoop the events and the CPU not in C3 state gets problems cause of the mutual bus. Thus, the CPUs of the multiprocessor system have to enter or leave the C3 state synchronously. In other words, each CPU is forced to be out of the C3 state when any CPU is waked up from the C3 state. Therefore, the most power-saving status can't be achieved.

The present invention provides a power management device for multiprocessor system and method thereof that overcomes shortcomings mentioned above of the multiprocessor system.

SUMMARY OF THE INVENTION

It is a primary object of the present invention to provide a power management device and method thereof, which can reduce power consumption of a multiprocessor system having a plurality of independent processors.

The power management device for the multiprocessor system in accordance with the present invention comprises at least one checking unit, a plurality of recording units and a plurality of arbiters respectively corresponding to the processors. The power management method for the multiprocessor system according to the present invention is to receive an event from a peripheral device by the checking unit for checking which processor the event corresponds and sending a checking signal according to the checking result. One of the recording units is used to record the received event according to the checking signal. When there is no record of the event in the recording unit, the corresponding processor will send a shut-down command and an entering C3 state command. Next, the corresponding arbiter is turned off according to the shut-down command while a first control signal is sent to the processor according to the entering C3 state command so as to force the processor into the C3 state.

After the processor entering the C3 state, once the checking unit receives another event and sends a checking signal that corresponds to the processor already in the C3 state, a second control signal is sent to the processor so as to wake the processor out of the C3 state. After out of the C3 state, the processor sends an issue command to turn on the corresponding arbiter.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFFERED EMBODIMENT

Figure 1:
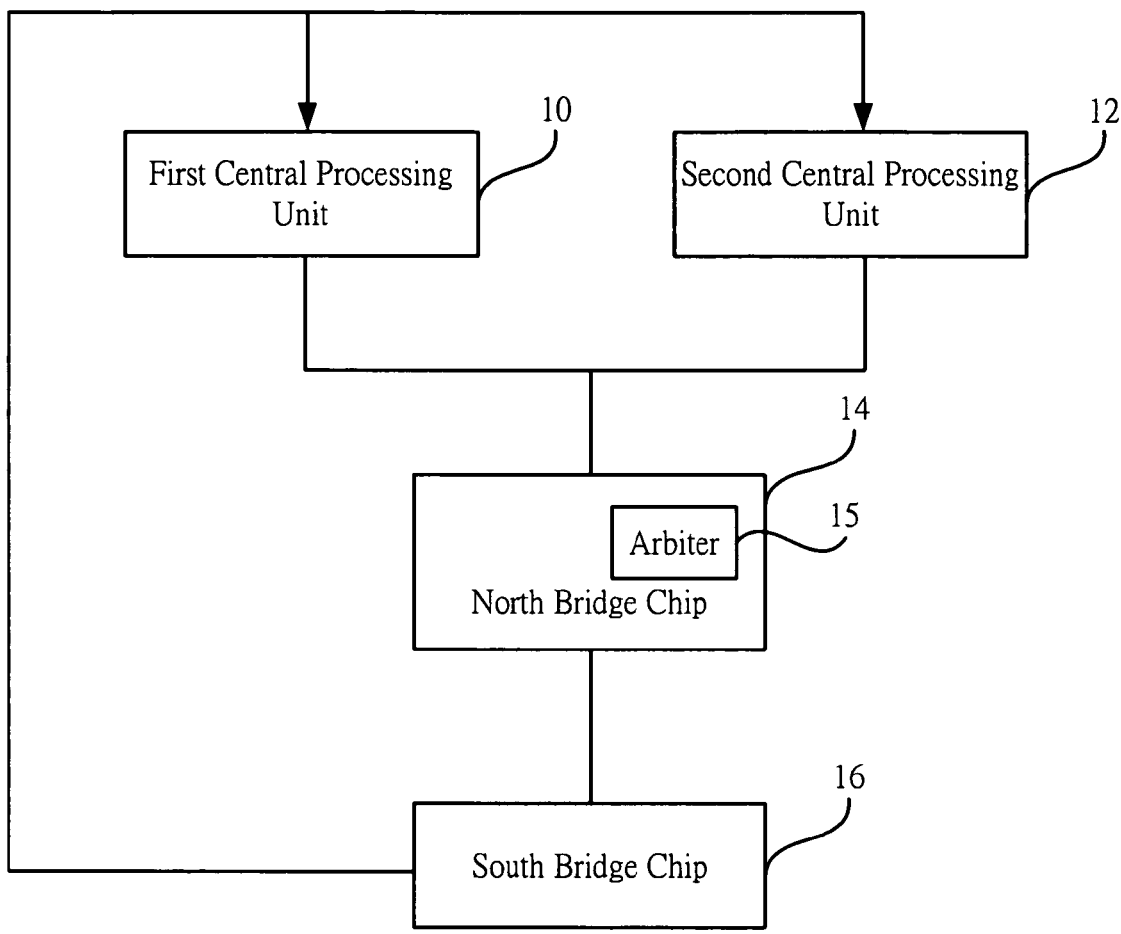
FIG. 1 is a block diagram of a conventional multiprocessor system.
Figure 2:
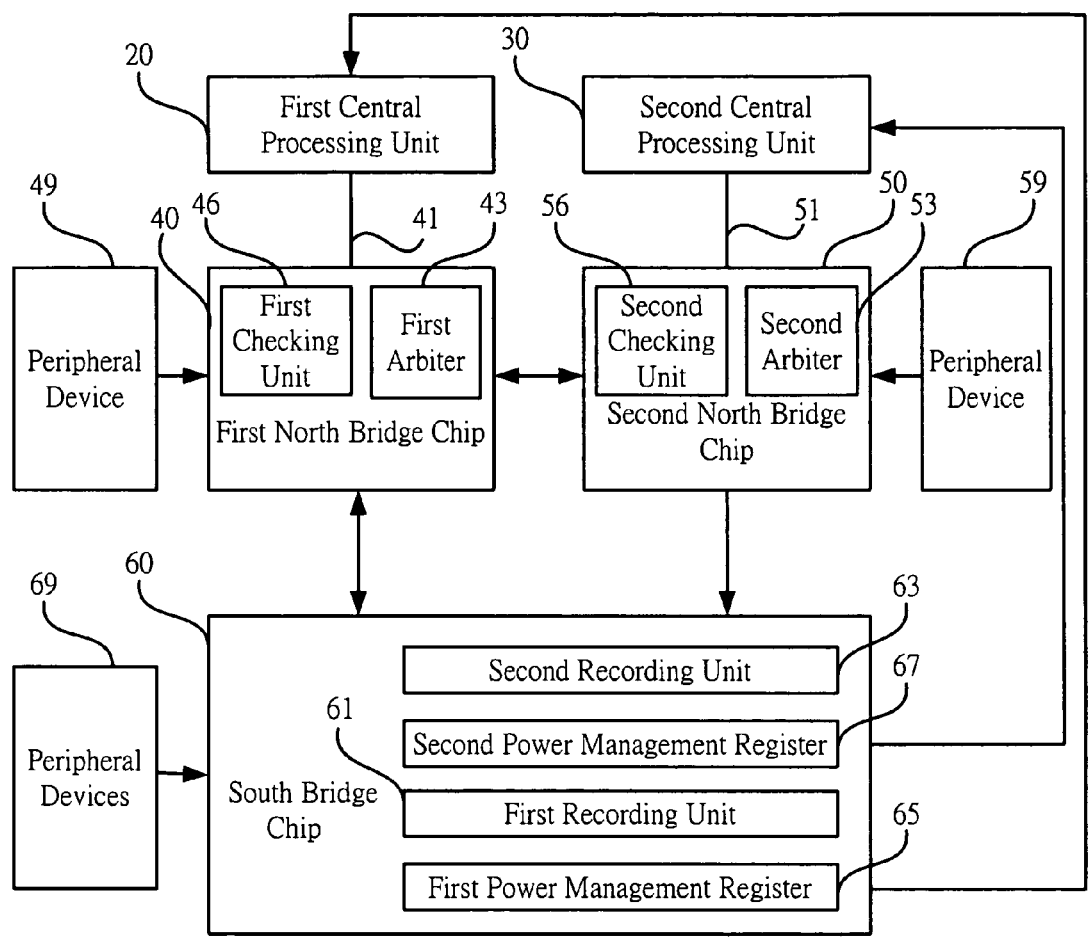
FIG. 2 is a block diagram of an embodiment in accordance with the present invention.

An example of a multiprocessing system (not labeled) implementing the principles of the invention is shown in FIG. 2, including two central processing units (CPUs) or processors 20, 30, a first north bridge (NB) chip 40, and a second north bridge chip 50, each having a independent bus 41, 51 for coupling to the CPUs 20, 30 respectively. A first arbiter 43 and a first checking unit 46 are disposed on the first north bridge chip 40 while a second arbiter 53 and a second checking unit 56 are disposed on the second north bridge chip 50. The two north bridge chips 40, 50 respectively couple to peripheral devices 49, 59. The first arbiter 43 and the second arbiter 53 could be arranged in other components other than the north bridge chips 40, 50. The present invention further include a south bridge chip 60, composed by a first recording unit 61, a second recording unit 63, a first power management register 65, and a second power management register 67. The two recording units 61, 63 and the two power management registers 65, 67 respectively correspond to the CPUs 20, 30. Moreover, the south bridge chip 60 couples to a peripheral device 69. The two recording units 61, 63 could be registers, if desired. The power management registers 65, 67 can be arranged somewhere else, not limited inside the south bridge chip 60. Disclosed herein, the terms "processor" and "central processing unite" (CPU) refer to circuitry that controls various functions of a computer system and will be used interchangeably.

When the two central processing units 20, 30 are in the C0 state, the peripheral device 49 coupled to the first north bridge chip 40 sends an event such as an interrupt event or a bus master event, the first checking unit 46 receives and checks that whether the event is sent from the peripheral device 49 to the first CPU 20 for being processed. If the received event corresponds to the first CPU 20, the event will be sent to the first CPU 20 through the first arbiter 43 for being processed. If the event doesn't in correspondence with the first CPU 20, the event will be directly transmitted to the second north bridge chip 50, and then the second checking unit 56 checks whether the event corresponds to the second CPU 30 for being sent to the second CPU 30 through the second arbiter 53. On the other hand, if the event is sent by the peripheral device 59 coupled to the second north bridge chip 50, the second checking unit 56 checks whether the event corresponds to the second CPU 30. If not, the event is transmitted to the first checking unit 46. Furthermore, the event from the peripheral device 69 coupled to the south bridge chip 60 is first transmitted to the first checking unit 46.

Now explain how the two checking units 46, 56 check the events. If the event is an interrupt event such as Message Signaled Interrupt (MSI), the two checking units 46, 56 directly check which CPUs 20, 30 the interrupt event corresponds to, since the interrupt event is marked with corresponding CPU 20 or 30 for processing. If the event is a bus master event that intends to read data from memory of the multiprocessor system, the memory of the present invention is divided into two storage sections in correspondence with the CPUs 20, 30 of the multiprocessor system respectively, because the bus master event having address of the data intended to read. Thus while checking the bus master event, the two checking units 46, 56 learn which storage section is intended to read according to the address in the bus master event, and further check which CPUs 20, 30 the event corresponds. The above-mentioned checking units 46, 56 can be decoders.

After checking the event, the checking unit 46 or 56 sends a checking signal to the south bridge chip 60 according to a checking result so as to force the south bridge chip 60 to write a record value into the corresponding first recording unit 61 or second recording unit 63, the received event is thus recorded. After execution, the operation system of the multiprocessor system continually monitors the state of the two recording units 61, 63, if it is detected that one of the recording units 61, 63 has no record of the received event in a certain period, the corresponding first CPU 20 or the second CPU 30 is caused to send a shut-down command as well as an entering C3 state command to the corresponding first north bridge chip 40 or the second north bridge chip 50, together with the south bridge chip 60 for entering into the C3 state. One of the two north bridge chips 40, 50 turns the corresponding first arbiter 43 or second arbiter 53 off according to the shut-down command while the south bridge chip 60 writes a set value into the corresponding first power management register 65 or second power management register 67. In accordance with the set value, the south bridge chip 60 sends a first control signal to the corresponding first CPU 20 or the second CPU 30 for entering the C3 state.

Figure 3:
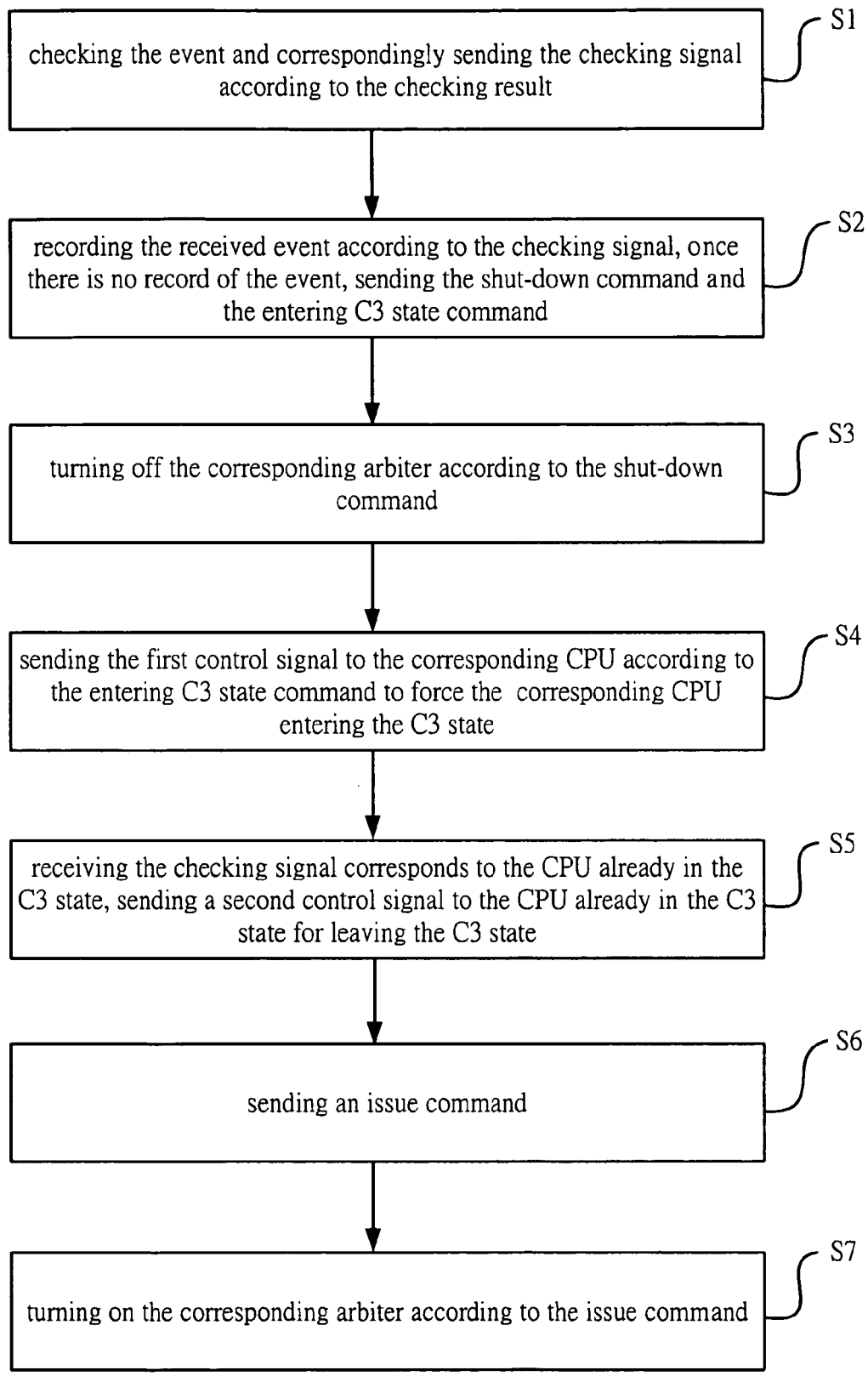
FIG. 3 is a flow chart of an embodiment in accordance with the present invention.

Referring to FIG. 3 and in conjunction with FIG. 2, take the first CPU 20 as an example for explaining process of entering and leaving the C3 state. When a bus master event sending by the peripheral device 49 for the first CPU 20 is transmitted to the first north bridge chip 40, the first checking unit 46 runs the step S1, checking the event and learn that the event is the bus master event corresponding to the first CPU 20. According to the checking result, the first checking unit 46 correspondingly sends the checking signal to the south bridge chip 60. Next, as shown in step S2, the record value is written into the first recording unit 61 according to the checking signal for recording the received event. When the operating system of the multiprocessor system continues detecting the second recording unit 63 and finding that there is no record related to the received event from the second north bridge chip 50, the operation system forces the second CPU 30 to send commands of shut-down and entering into the C3 state to the second north bridge chip 50 and the south bridge chip 60 respectively.

Referring to step S3, the second north bridge chip 50 turns off the second arbiter 53 according to the shut-down command. Then, as shown in step S4, the south bridge chip 60 sends the first control signal to the second CPU 30 according to the entering C3 state command so as to force the second CPU 30 entering the C3 state for reducing power consumption while the first CPU 20 operates normally without influence of the second CPU 30. Once receiving the entering C3 state command, the south bridge chip 60 writes the set value into the second power management register 67 according to the entering C3 command and then correspondingly sends the first control signal to the second CPU 30 in accordance with the set value.

When the peripheral device 59 sends the event which is going to be processed by the second CPU 30 to the second north bridge chip 50, the second checking unit 56 checks the event and sends a corresponding checking signal to the south bridge chip 60. Referring to step S5, because the second CPU 30 is in C3 state, the south bridge chip 60 have to send a second control signal to the second CPU 30 so as to force the second CPU 30 out of the C3 state to process the event from the peripheral device 59. At this moment, the second arbiter 53 is off so that the event can't be sent to the second CPU 30. Therefore, after leaving the C3 state, the second CPU 30 runs the step S6, sending an issue command to the second north bridge chip 50. The second north bridge chip 50 takes the step S7, turn on the second arbiter 53 according to the issue command for transmitting the event to the second CPU 30.

Figure 4:
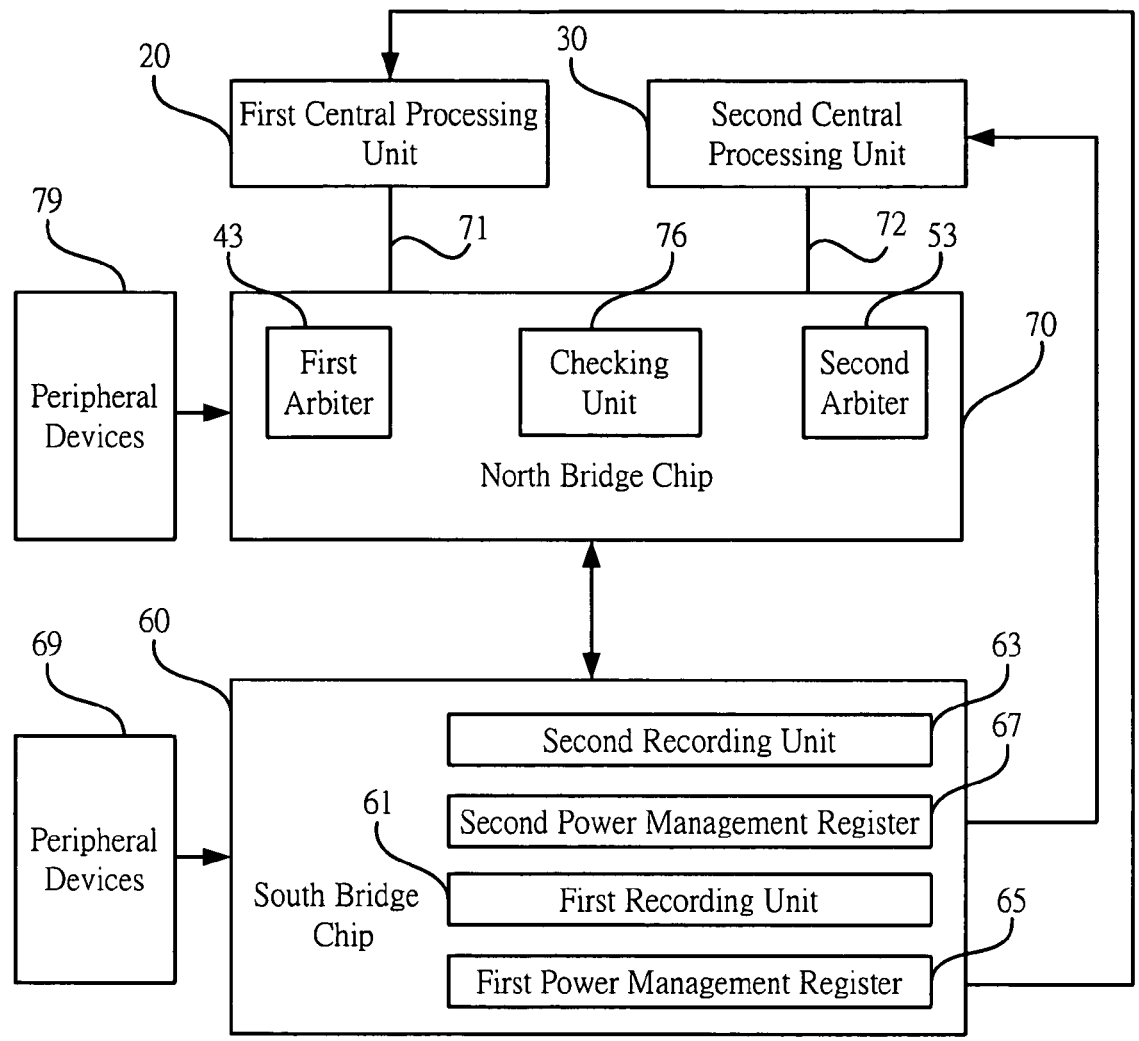
FIG. 4 is a block diagram of another embodiment in accordance with the present invention.

Referring to FIG. 4, it is a block diagram of another embodiment of the present invention. The difference between this embodiment and the embodiment in FIG. 2 is in that the first north bridge chip 40 and the second north bridge chip 50 are integrated into one north bridge chip 70. By disposition of a plurality of independent buses 71, 72, the north bridge chip 70 is coupled to the two central processing units 20, 30 respectively. Moreover, the first arbiter 43 and the second arbiter 53 that corresponds to the CPUs 20, 30 are disposed on the north bridge chip 70. The north bridge chip 70 further has a checking unit 76. The cost of the invention disclosed in this embodiment is lower than that of the embodiment in FIG. 2 due to the smaller number of components. The checking unit 76 is used for checking that the event transmitted from the peripherals 69, 79 coupled to the south bridge chip 60 and the north bridge chip 70 corresponds to the first CPU 20 or the second CPU 30, and sending a corresponding checking signal to the south bridge chip 60. The south bridge chip 60 writes the record value into the corresponding first recording unit 61 or the second recording unit 63 in accordance with the checking signal for recording the received event.

Once the operating system executes and continuously detects that there is no record of the received event that is going to be processed in the first recording unit 61 or the second recording unit 63, the corresponding first CPU 20 or the second CPU 30 is forced to send a shut down command and an entering C3 state command to the north bridge chip 70 and the south bridge chip 60 respectively. Thus, the north bridge chip 70 is forced to shut down the corresponding first arbiter 43 or the second arbiter 53 while the south bridge chip 60 is forced to send a first control signal to the corresponding first CPU 20 or second CPU 30 for entering C3 state. If the event for processing checked by the north bridge chip 70 corresponds to the first CPU 20 or second CPU 30 already in the C3 state, the south bridge chip 60 will send a second control signal to the first CPU 20 or second CPU 30 for waking them from the C3 state. In summary, the power management device for multiprocessor system and method thereof in accordance with the present invention is capable of checking the received event for processing by the checking unit 46, 56, 76 and recording the received event by the recording unit 61, 63. When one of the recording units is continuously detected that there is no record of the event, the corresponding CPU 20 or 30 is forced to enter the C3 state. If the event for processing received by the one of the checking units 46, 56, 76 corresponds to the CPU 20 or 30 already in the C3 state, the CPU 20 or 30 will wake up from the C3 state. In this manner, the present invention forces one of the CPUs 20, 30 of the multiprocessor system independently entering or leaving the C3 state without influence of the other CPUs 20, 30. Therefore, a purpose of better power management is achieved.

Additional advantages and modifications will readily occur to those skilled in the art. Therefore, the invention in its broader aspects is not limited to the specific details, and representative devices shown and described herein.

Accordingly, various modifications may be made without departing from the spirit or scope of the general inventive concept as defined by the appended claims and their equivalents.

What is claimed is:

1. A power management device, applied in a multiprocessor system with a plurality of processors, comprising:
    at least one checking unit coupled to a peripheral device to receive therefrom an event, wherein said at least one checking unit determines which one of the plurality of processors the received event corresponds to and sends a checking signal;
    a plurality of recording units corresponding to the processors respectively, one of the plurality of recording units recording the received event according to the checking signal, wherein said recording unit recording the received event corresponds to the processor corresponding to the received event, and wherein one of the plurality of processors corresponding to one of the plurality of recording units recording no event sends a shut-down command and an entering C3 state command; and
    a plurality of arbiters corresponding to the processors respectively, wherein an arbiter corresponding to the processor sending the shut-down command is turned off according to the shut-down command;
    wherein a first control signal is sent according to the entering C3 state command, and wherein the processor corresponding to the arbiter being turned off receives the first control signal for entrance of a C3 state.

2. The device as claimed in claim 1, wherein said plurality of recording units are disposed on a south bridge chip, said south bridge chip writing a record value into said one recording unit according to the checking signal for recording the received event.

3. The device as claimed in claim 1, wherein said one of said plurality of recording units is a register.

4. The device as claimed in claim 1, wherein the first control signal is sent from a south bridge chip.

5. The device as claimed in claim 4, further including a plurality of power management registers disposed on the south bridge chip, corresponding to the plurality of processors respectively; while receiving the entering C3 state command, the south bridge chip correspondingly writes a set value into one of the power management registers and sends the first control signal to the processor corresponding to the arbiter being turned off for entering the C3 state according to the set value.

6. The device as claimed in claim 1, wherein each of said plurality of arbiters is disposed on and is corresponding to one of a plurality of north bridge chips.

7. The device as claimed in claim 6, wherein said at least one checking unit is disposed on a corresponding north bridge chip.

8. The device as claimed in claim 1, wherein each of said plurality of arbiters is disposed on a north bridge chip.

9. The device as claimed in claim 8, wherein said at least one checking unit is disposed on the north bridge chip.

10. The device as claimed in claim 1, wherein said at least one checking unit is a decoder.

11. The device as claimed in claim 1, further comprising a memory, wherein said memory of the multiprocessor system has a plurality of storage sections each respectively corresponding to one of the plurality of processors, and wherein, when a bus master event is received, said at least one checking unit determines which one of the plurality of processors the bus master event corresponds to in correspondence with an address of the bus master event assigned in the memory.

12. the device as claimed in claim 1, further comprising an operating system for detecting whether each of the recording units has record of the event, wherein the processor corresponding to said recording unit having no record of the event, is prompted to send the shut-down command and the entering C3 state command.

13. The device as claimed in claim 1, wherein if said at least one checking unit receives another event corresponding to the processor in the C3 state, a second control signal is sent to the processor in the C3 state for prompting the processor to leave the C3 state and to send an issue command to turn on the corresponding arbiter.

14. The device as claimed in claim 13, wherein the second control signal is sent from a south bridge chip.

15. A power management method applied to a multiprocessor system with a plurality of processors, a plurality of recording units corresponding to the plurality of processors, and a plurality of arbiters corresponding to the plurality of processors, comprising the steps of:
    receiving an event from a peripheral devices;
    checking which processor of the plurality of processors the received event corresponds to and correspondingly sending a checking signal;
    recording the received event in one of the plurality of recording units according to the checking signal, wherein said recording unit corresponds to the processor corresponding to the received event;
    once there is no record of the event, sending a shut-down command and an entering C3 state command by the corresponding processor;
    turning off the corresponding arbiter according to the shut-down command; and
    sending a first control signal according to the entering C3 state command, wherein the processor corresponding to the turned off arbiter receives the first control signal for entering into the C3 state.

16. The method as claimed in claim 15, wherein the step of recording the received event according to the checking signal further comprises:

writing into said recording unit a record value in accordance with the checking signal for recording the received event.

17. The method as claimed in claim 15, wherein the step of sending the entering C3 state command by the corresponding processor once no record of the event is determined further comprises:

writing into a respective one of a plurality of power management registers a set value in accordance with the entering C3 state command to send the first control signal according to the set value to prompt the corresponding processor to enter the C3 state.

18. The method as claimed in claim 15, wherein the step of sending the shut-down command and the entering C3 state command by the corresponding processor once there is no record of the event, further comprises:

checking for a recorded event, and sending the shut-down command and the entering C3 state command by the corresponding processor, once no record of the event is detected.

19. The method as claimed in claim 15, wherein, upon receipt of another event corresponding to the processor operating in the C3 state, sending a second control signal to the processor operating in the C3 state for prompting the processor to leave the C3 states, and sending an issue command to turn on the corresponding arbiter.

* * * * *